United States Patent Office 3,450,736
Patented June 17, 1969

3,450,736
MODIFIED SILOXANE POLYMERS AND COMPOSITIONS CONTAINING SAME
Francis G. A. De Monterey, Woodbury Heights, N.J., assignor to Mobil Oil Corporation, a corporation of New York
No Drawing. Filed Sept. 12, 1963, Ser. No. 308,335
Int. Cl. C07f 7/08
U.S. Cl. 260—448.2                    9 Claims This invention relates to the production of certain modified siloxane polymers and to improved compositions containing these polymers.

Polymeric organosiloxane fluids, possessing a structure comprising alternating silicon and oxygen atoms with organo groups attached to the silicon atoms, have become important industrial materials. These polymers are used as protective coatings, as mold release agents and due to their insolubility in oil, minute amounts of the polymers are incorporated in petroleum oils or petroleum oil compositions to prevent or suppress foaming. In this latter use the organo siloxane polymers apparently function by forming a finely dispersed insoluble liquid phase which causes the films of the oil foam to rupture thereby quickly destroying the foam.

Although these polymeric organosiloxanes are available in a variety of molecular weights they do have several disadvantages which make them inapplicable or only poorly applicable under certain conditions, particularly in the lubricating field. First of all, because of their high content of silicon and oxygen atoms they are, as mentioned above, substantially oil-insoluble and generally incompatiable with common hydrocarbon oils in present use. Secondly, they are quite expensive compared to petroleum lubricating products presently available. In addition, the lubricity capabilities of these organosiloxane polymers are often poor with respect to certain metals.

It has now been found that it is possible to produce modified siloxane polymers which are for the most part, free from the above disadvantages and which are especially suitable for use as lubricants or in lubricating compositions.

It is therefore an object of the present invention to provide certain novel modified siloxane polymers. A further object is to provide a simple and effective process for producing these modified polymers. Another object is to provide improved compositions containing these polymers.

Further objects of this invention and some advantages thereof will become apparent hereinafter.

Broadly stated, it has been found that by reacting (1) a siloxane polymer containing hydrogen atoms directly bonded to the silicon atoms with (2) a compound containing at least one ethylenic unsaturation, in the presence of suitable catalysts, modified siloxane polymers are obtained which are oil-soluble, relatively economical, possess improved lubricity characteristics, exhibit good high and low temperature stability, and are, in general, capable of enhancing the desirable properties of oil compositions.

The siloxane polymer reacted with the unsaturated compound according to the present invention contain hydrogen atoms bonded directly to the silicon atoms of the polymer chain. These polymeric siloxanes thus may be characterized as containing the recurring structure:

wherein R is a hydrogen atom, a hydrocarbyl group, such as an alkyl, cycloalkyl, aryl, alkaryl, aralkyl group containing preferably from 1 to 30 carbon atoms, or as in the case of a crosslinked polymer, a siloxane side chain similar to the main polymer chain. When R is a hydrocarbyl group the R/H ratio of the polymer is desirably from about 1 to about 2.

These siloxane polymers may possess a linear or cyclic structure. The cyclic structure will, of course, comprise cyclic chains containing the above recurring unit, while a linear structure may be represented, for example, by the formula,

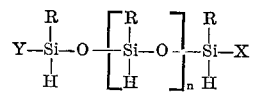

wherein R has the aforementioned meaning, the end groups X and Y which may be the same or different, represent hydrogen atoms, hydrocarbyl groups or alkoxy groups and $n$ indicates the number of recurring units.

In general, the siloxane polymers reacted according to the invention possess molecular weights of at least 500.

Polymeric (methyl hydrogen) siloxanes possessing either a linear or cyclic structure containing the repeating units:

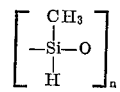

and possessing a molecular weight of from at least 500 to about 10,000, preferably from about 1000 to about 5000 are particularly suitable.

The unsaturated compounds used in the production of the instant modified siloxane polymers may be selected from the compounds containing at least one unsaturated double bond. This includes hydrocarbons, that is, monoolefins either straight chain, or branched chain, e.g., hexene-1, decene-1, etc.; cycloolefins such as cyclohexene, cycloheptene; polyolefins such as butadiene or polymeric materials containing ethylenic unsaturation such as polybutenes; and aromatic compounds exemplified by styrene. In addition, unsaturated organic compounds containing oxygen atoms and nitrogen atoms including esters wherein either the acid or alcohol moiety contains an unsaturated double bond such as dioctyl maleate, dioctyl fumarate, methyl-10-undecenoate, glyceryl monooleate; unsaturated acids or anhydrides such as tetrapropenylsuccinic anhydride and amine salts such as dibutyl amine methacrylate may be employed.

In general, unsaturated compounds of the above mentioned types containing from 4 to about 30 carbon atoms are suitable.

One unsaturated compound or mixtures thereof may be used in the modification of the Si—H containing siloxane polymer.

The relative proportions of the polymeric siloxane containing the Si—H groups and the unsaturated compound used will vary depending on the particular type of modified polymer desired. The unsaturated compound may be employed in proportions sufficient to provide at least a stoichiometrically equivalent amount of unsaturated linkages per Si—H group; in which case substantially no Si—H bonds remain in the modified polymer.

Less than stoichiometric amounts of unsaturated linkages may also be used and the resulting modified polysiloxanes will then possess residual Si—H bonds. Modified siloxane polymers produced by reacting the siloxane polymers containing the Si—H bonds with from about 5 to about 95%, preferably from about 30 to about 50% of the stoichiometric amount of unsaturated bonds are preferred.

The synthesis of the modified siloxane polymers of the invention is conducted by co-reacting the unsaturated compound and the siloxane polymer in the presence of a suitable catalyst. Some examples of catalyst include alkyl or aryl primary, secondary or tertiary amines containing preferably from 1 to about 8 carbons such as monoethyl amine, diethylamine, triethyl amine, etc; the alkaline earth metal soaps of the $C_5$ to $C_{32}$ saturated and unsaturated fatty acids such as the soaps of Ba, Ca, Sr; and the platinum group metals including Pt, Pd, Ru, Os, etc.

Platinum supported on finely divided charcoal and containing from about 0.01 to about 3.0 percent by weight of platinum is a preferred catalyst.

The catalyst may be present in amounts from about 0.1 to about 5.0 percent based on weight of reactants.

The synthesis of the modified siloxane polymers may be carried out at temperatures in the range from about 20° C. to about 260° C., preferably from about 140° C. to about 200° C. under substantially atmospheric pressures. Pressures above atmospheric may be used, especially when the unsaturated compound employed is normally volatile or gaseous.

The mechanism for the reaction between the siloxane polymer containing silicon to hydrogen bonds (I) and the unsaturated compound (II) may be illustrated as follows:

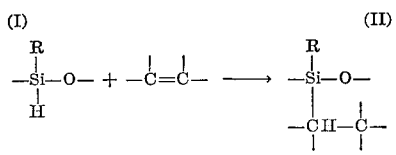

It will be noted that R of the starting siloxane polymer may be hydrogen or a hydrocarbyl group. When R of the starting polymer (I) is a hydrocarbyl group there will, of course, be no addition reaction of this group with the double bond of the unsaturated compound and so any hydrocarbyl groups attached to the Si atoms of the starting polymer remain in this position in the resulting modified polymer. On the other hand, where R is hydrogen, an addition reaction may also take place between this additional hydrogen and further amounts of the unsaturated compound (II) so that in this case the two substituents attached to the silicon atoms of the modified polymer chain are supplied by the unsaturated compound.

The modified polymers produced using at least stoichiometric amounts of unsaturated bonds with respect to the Si—H units may be characterized as containing the recurring structure:

wherein $R_1$ and $R_2$ each represents the same or different hydrocarbyl groups, oxygen-containing organyl groups or nitrogen-containing organyl groups preferably containing from 1 to about 3 carbon atoms.

When less than stoichiometric amounts of double bonds are used with respect to the Si—H units, the resulting modified polymer will possess residual Si—H units and this polymer will contain repeating units of structure (1) above along with units of the structure:

where $R_3$ represents a hydrogen atom or hydrocarbyl, oxygen-containing organyl, or nitrogen-containing organyl groups preferably containing from 1 to about 30 carbon atoms.

A significant advantage of the instant process for producing the modified siloxane polymers is its relative simplicity. The unsaturated compound and the polymer containing Si—H bonds directly react by an addition reaction to form desired product. No by-products or intermediate products are formed by any significant extent and thus no stripping or finishing steps are necessary in order to recover the modified polymer. Ordinarily, only the removal of catalyst residues from the polymer product is required. A contributing factor to the effectiveness and simplicity of this process is the nature of the starting polymer. Thus, the unmodified siloxane polymers used according to the present invention contain no halogen atoms. Halogens have a tendency to hydrolyze thereby producing various by-products which would complicate the recovery of the desired product.

It will be noted from the above description that by the selection of particular type of unsaturated compound a variety of substituents may be introduced into the siloxane polymer. Thus, the characteristics of the polymer may be appropriately modified depending on the nature of the unsaturated compound. For example, when a monoolefin such as hexene-1 is employed as the unsaturated compound, the resulting introduction into the polymer chain of hydrocarbon groups significantly increases the oil-solubility of the siloxane polymer with respect to hydrocarbon oils.

The modified siloxane polymers produced according to the present invention may, in general, possess molecular weights of above 500, preferably from 1000 upwards. Polymers in the range from 1000 to 10,000 are of particular interest. The modified polymers are generally in the form of fluids, however, cross-linked or very high molecular weight polymers of this type may exist as resinous solids.

The modified siloxanes of the invention have a variety of uses. Those containing substantially no residual Si—H bonds in the polymer chain, in general, exhibit good oil-solubility, low viscosity temperature coefficients, high V.I., high flash and fire points, good stability at both high and low temperatures and improved lubricity characteristics. These polymers are therefore effective as lubricants by themselves or they may be blended with oils or lubricating compositions in order to impart thereto the above characteristics. The modified siloxane polymers containing residual Si—H bonds possess good oil-solubility and are effective corrosion inhibitors, especially as copper corrosion inhibitors in lubricating compositions.

A variety of lubricating oils, both petroleum base oils and synthetic oils, e.g., synthetic hydrocarbon and synthetic ester oils, may have their characteristics improved by the addition of the modified siloxane polymers of the present invention. More particularly, the modified siloxane polymers are especially adapted for use as low or high temperature hydraulic fluids, jet or missile lubricants either alone or in formulation with other oils.

The particular amounts of modified siloxane polymer added to the oils or lubricating compositions will depend on various factors, such as the nature of the lubricating oil, the presence or absence of other additives and the use to which the particular lubricants are to be put. In general, from about 0.001% to about 50%, preferably from about 0.1% to 2.0% of the modified siloxane polymers may be present.

The following specific embodiments are given to further illustrate the nature of the present invention.

In each of the following examples the catalyst is a commercially available (e.g., Englehart Ind.) platinum-on-charcoal catalyst containing 1% by weight of platinum.

EXAMPLE 1

60 grams (one mole equivalent based on

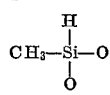

as the repeating unit) of poly (methyl hydrogen) siloxane (molecular weight=2000–5000, K.V. at 100° F.=40 cs., produced from methyl hydrogen dichloro silane and available from G.E. under the name DF–268) is blended with 280 grams (2 moles) of decene-1 in a vessel equipped with a reflux condenser. The excess decene-1 is used as reaction solvent, and also helps drive the reaction to completion. The catalyst (0.1 gm.) is added and the mixture heated while simultaneously maintaining agitation under reflux conditions, to a temperature of 172° C., and held at this temperature for about 24 hours. Infrared spectroscopic examination is carried out to monitor the completion of the reaction by determining the residual concentration of the Si—H bond which shows a uniquely characteristic band at 4.62 microns. The resultant fluid product is filtered to eliminate the catalyst powder, and vacuum stripped at a pressure of 100 microns (Hg) and at a temperature of 90° C.

EXAMPLE 2

Following the procedure of Example 1, 58 gms. of methyl-10-undecenoate and 19.1 gms. of a stripped poly (methyl hydrogen) siloxane similar to that of Example 1, is added to the reaction vessel. 169 gms. of xylene is used as reaction solvent, under reflux conditions. The modified siloxane polymer product in fluid form is filtered and recovered.

EXAMPLE 3

In this embodiment ½ mole of methyl-10-undecenoate, ½ mole of decene-1 are reacted with 1 mole equivalent of a poly (methyl hydrogen) siloxane similar to that of Example 1.

Seventy gms. of decene-1, 99 gms. of the ester and 60 gms. of the poly (methyl hydrogen) siloxane are added to the reaction vessel together with 100 gms. of xylene. This mass is refluxed in the presence of 0.1 gm. of the platinum-on-charcoal catalyst. After a total of 20 hours reflux time, the infrared spectographic analysis shows that Si—H bond has substantially disappeared. The resulting modified polysiloxane fluid is then stripped at 10 microns (Hg) and 160° C. to remove any trace amounts of unreacted olefin or ester.

EXAMPLE 4

One hundred and ninety-nine gms. of methyl-10-undecenoate 60 gms. of a poly (methyl hydrogen) siloxane similar to that of Example 1, 100 gms. of xylene and 0.1 gm. of the catalyst are mixed together and heated under reflux for 24 hours. The resulting material is charged to a distillation unit for a stripping step which is carried out at 80 microns (Hg) pressure, and 120° C. During this stripping, which is extremely severe in order to reduce the volatility of the final product, a pressure of 10 micron (Hg) and a temperature of 225° C. are reached. Small amounts of unreacted methyl-10-undecenoate and poly (methyl hydrogen) siloxane are detected in the overhead fraction. A modified polysiloxane in fluid form is recovered.

EXAMPLE 5

This embodiment demonstrates the addition of a basic amine salt of methacrylic acid to the siloxane chain.

Eighty-six gms. (1 mole) of methacrylic acid is diluted with 200 gms. of xylene then stirred and slowly neutralized by dropwise addition of 129.1 gms. (1 mole) of dibutylamine. At the end of this neutralization reaction, 0.2 gm. of catalyst and 60 gms. (1 mole equivalent) of poly (methyl hydrogen) siloxane fluid are added. Stirring is continued under gentle heating for an extended period of several hours to detect possible degradation or cross-linking of the siloxane polymer in the presence of the amine salt. When no gas evolution is noted after several hours, signifying the absence of such a degradative reaction, the temperature is raised until xylene reflux occurs. One hundred and eighty-eight grams of N,N-dimethyl myristyl amide are added to the reaction solution as a diluent and the stripping of the xylene is continued to completion. The resulting modified polymer fluid is analyzed in this diluent.

EXAMPLE 6

Following the procedure of Example 1, 340 gms. (1 mole equivalent) of dioctyl maleate is reacted with 60 gms. (1 mole equivalent) of a poly (methyl hydrogen) siloxane similar to that of Example 1, in the presence of 200 gms. of xylene and the platinum-on-charcoal catalyst (0.1 gm.). The liquid product is filtered and stripped.

EXAMPLE 7

Three hundred forty grams (1 mole) of dioctyl fumarate is reacted with 60 gms. (1 mole equivalent) of a poly (methyl hydrogen) siloxane similar to that of Example 1, in the presence of 200 gms. of xylene and 0.1 gm. of the catalyst. The resulting modified polysiloxane fluid is filtered and stripped under low pressure.

EXAMPLE 8

Ninety-three gms. of glyceryl monooleate (redistilled pure grade) are refluxed with 15 gms. of poly (methyl hydrogen) siloxane, similar to that of Example 1, in the presence of 0.1 gm. of the platinum-on-charcoal catalyst. No precautions are taken to protect the hydroxyl groups since the platinum catalyst reaction is extremely specific. The resulting product is stripped at a pressure of 0.4 mm. (Hg) and a temperature of 150° C. This product is an almost white solid of low melting point.

EXAMPLE 9

One hundred twenty gms. (2 moles equivalents) of poly (methyl hydrogen) siloxane similar to that of Example 1, are added to 532 gms. (2 moles) of tetrapropenylsuccinic anhydride (TPSA) and 200 gms. of xylene. One-half gram of the platinum-on-charcoal catalyst is added and a nitrogen blanket is used to prevent oxidation of the anhydride. The resultant fluid is stripped at 0.1 mm. (Hg) and 150° C. The isopropyl ester of the TPSA is then produced by refluxing in the presence of excess isopropanol until most of the refluxing subsides. Water is eliminated from this reaction by means of a Dean-Starke tube. The resulting yellow fluid is filtered and stripped.

Some characteristics of the modified polysiloxanes obtained according to Examples 1–9 given in the following Table 1.

TABLE 1

| Example No. | 1 | 2 | 3 | 4 | 5 | 6 | 7 | 8 | 9 |
|---|---|---|---|---|---|---|---|---|---|
| Polymer | PMH siloxane.[1] | PMH siloxane. | PMH siloxane. | PMH siloxane. | PMH siloxane. | PMH siloxane. | PMH siloxane. | PMH siloxane. | PMH siloxane.[3] |
| Unsaturated cmpd. | Decene-1. | Methyl-10-undecenoate. | Decene-1 plus methyl-10-undecenoate.[2] | Methyl-10-undecenoate. | Dibutylamine methacrylate. | Dioctyl maleate. | Dioctyl fumarate. | Glyceryl monooleate. | TPSA. |
| ≡Si—H/unsaturated cmpd., molar ratio. | 1:1 | 1:1 | 1:1 | 1:1 | 1:1 | 1:1 | 1:1 | 1:1 | 1:1. |
| KV at 100° F | 106.3 | 421 | 654.1 | 1,811 | 29.03 | 142 | 204.5 | 484.9 | 523. |
| KV at −30° F | | | | | | 52,494 | 64,546 | | |
| KV at 210° F | 34.9 | 101.5 | 153 | 314.4 | 5.42 | 23.83 | 34.97 | 40.22 | 19.67. |
| V. I. | 149.6 | 137 | 120 | 168 | 134 | 142 | 140 | 199 | |
| KV at 400° F | 14.0 | | 33.73 | 58.1 | | 6.4 | 17.31 | 6.92 | 2.17. |
| Pour point | | −10 | −15 | 10 | | −35 | −35 | 65 | 15. |
| Vapor pr., 150° C | | | 10.4 | 5.1 | | 3.7 (160° C.) | 9.1 (160° C.) | | |
| Vapor pr., 200° C | | | | 32(210° C) | | 24.4 | | | |
| Flash point | | | 525 | 550 | | 420 | 415 | 525 | 385. |

[1] Poly (methyl hydrogen) siloxane.
[2] ½ mol decene-1 plus ½ mol methyl-10-undecenoate.
[3] TPSA (tetrapropenylsuccinic anhydride) esterified with excess isopropanol.

The following Examples 10–14 are directed to the preparation of modified siloxane polymers prepared by partial addition of unsaturated compounds to the siloxane polymer. The resulting products therefore still contain Si—H units.

EXAMPLE 10

Sixty gms. (1 mole equivalent) of a poly (methyl hydrogen) siloxane similar to that of Example 1, 70 gms. of decene-1 (½ mole equivalent), 100 gms. of xylene as the reaction solvent and 0.2 gm. of the platinum-on-charcoal catalyst are blended and refluxed for 48 hours. The resulting material is subjected to infrared spectroscopic examination and the reaction is found to be complete based on an estimation of the absorbance peak of the Si—H bond. The modified polymer product is then vacuum stripped in the usual manner at about a temperature of 120–150° C. and 1–10 microns (Hg) pressure.

EXAMPLE 11

One hundred four gms. of styrene (1 mole equivalent), 120 gms. (2 moles equivalent) of a stripped poly (methyl hydrogen) siloxane similar to that of Example 1, 400 gms. of xylene and 0.1 gm. of the platinum-on-charcoal catalyst are blended and refluxed at atmospheric pressure for three days. The resulting modified polymer in fluid form is recovered following Example 10.

EXAMPLE 12

Seventy gms. of decene-1, 120 gms. of a stripped poly (methyl hydrogen) siloxane similar to that of Example 1, 200 gms. of xylene and 0.1 gm. of the platinum-on-charcoal catalyst are refluxed until the reaction is complete. The resulting modified polymer product is treated according to the procedure of Example 10.

EXAMPLE 13

One hundred thirty-four gms. of a stripped poly (methyl hydrogen) siloxane similar to that of Example 1, 58 gms. of styrene, 200 gms. of xylene and 0.8 gm. of the platinum-on-charcoal catalyst are blended and refluxed until the reaction is complete (about 48 hours). The modified polymer product is treated and recovered according to the procedure of Example 10.

EXAMPLE 14

Three hundred gms. of a stripped poly (methyl hydrogen) siloxane similar to that of Example 1, 235 gms. of decene-1, 200 gms. of xylene and 0.5 gm. of the platinum-on-charcoal catalyst are blended and refluxed until the reaction is complete (about 48 hours). The modified polymer product is stripped at a temperature of 80° C. and a pressure of 100 microns (Hg) and filtered. The modified polymer is in the form of a fluid.

Corrosion test

The corrosion inhibiting characteristics of the modified siloxane polymers of Examples 10, 12 and 13 are tested according to the ASTM D-130-56 copper corrosion test. The general procedure for this test comprises placing a polished copper strip in 30 ml. of the oil sample to be tested contained in a 25 x 150 mm. test tube and heating the tube. The copper strip is later removed, washed and compared with the ASTM Copper Strip Corrision Standards. The strips are given a rating from 1 to 4. A rating of 1 indicates substantially no corrosion, while 4 designates a very badly corroded strip.

The modified siloxane polymers are blended with a base oil and subjected to the test conditions. The results are reported in the following Table 2.

TABLE 2.—COPPER CORROSION TEST ASTM D130-56

| Components: | | | | | | | | | |
|---|---|---|---|---|---|---|---|---|---|
| Base oil [1] (wt. percent) | 100 | 99.0 | 99.5 | 99.9 | 99 | 99.5 | 99.9 | 99 | 99.5 | 99.9 |
| Modified polymer of Ex. 10 | | 1 | 0.5 | 0.1 | | | | | | |
| Modified polymer of Ex. 12 | | | | | 1 | 0.5 | 0.1 | | | |
| Modified polymer of Ex. 13 | | | | | | | | 1 | 0.5 | 0.1 |
| Test results | 2 4 | 3 1 | 1 | 1 | 1 | 1 | 1 | 1 | 1 | 1 |

[1] 95% of solvent refined turbine oil neutral, S.U.V. at 210° F.=65, plus 5% of solvent refined turbine oil neutral, S.U.V. at 210° F.=43.
[2] Cu strip is badly corroded, black color with green shade barely showing.
[3] Slight tarnish, almost same as freshly polished strip.

It will be noted from the corrosion test results that the modified siloxane polymers containing residual Si—H units are extremely effective copper corrosion inhibitors.

It will, of course, be appreciated that many variations and modifications can be practised without departing from the scope and spirit of the present invention.

Having thus described the invention, what I desire to secure and claim by Letters Patent is:

1. An oil-soluble modified siloxane polymer produced by the process comprising reacting a siloxane polymer, having a molecular weight of 500 to about 10,000 and containing Si—H bonds, with an unsaturated compound selected from the group consisting of mono-olefins, cyclo-olefins, polyolefins, aromatic olefins, acids and amine salts and esters of acids containing olefinic unsaturation, and mixtures thereof, said compounds having from 4 to about 30 carbon atoms, being reacted with said siloxane polymer in an amount of from about 30% to about 50% of the stoichiometric requirement, thereby being insufficient to substitute all of the Si—H bonds in the siloxane polymer, said reaction being conducted in the presence of a suitable catalyst therefor.

2. The polymer of claim 1 wherein the siloxane polymer is a poly(organo hydrogen) silioxane having a molecular weight in the range of 1000 to 5000, wherein the organo radical is selected from the group consisting of alkyl, cycloalkyl, aryl, aralkyl, and alkaryl, having 1 to 30 carbon atoms.

3. The polymer of claim 1 wherein the siloxane polymer is a poly(methyl hydrogen) siloxane.

4. The polymer of claim 1 wherein the unsaturated compound is an olefin.

5. The polymer of claim 4 wherein the unsaturated compound is decene-1.

6. The polymer of claim 4 wherein the unsaturated compound is styrene.

7. The polymer of claim 1 wherein the unsaturated compound is derived from an unsaturated acid.

8. The polymer of claim 1 wherein the unsaturated compound is selected from the group consisting of methyl-10-undecenoate, methacrylic acid, dioctyl maleate, dioctyl fumarate, glycerol mono-oleate, tetra-propenylsuccinic anhydride.

9. The polymer of claim 4 wherein the unsaturated compound is present in an amount of one equivalent per 4 equivalents of siloxane polymer reactant.

References Cited

UNITED STATES PATENTS

| 2,384,384 | 9/1945 | McGregor et al. | 260—448.2 |
| 2,432,665 | 12/1947 | Hyde | 260—448.2 |
| 2,588,366 | 3/1952 | Dennett | 260—448.2 |
| 2,595,891 | 5/1952 | Sauer | 260—448.2 |
| 2,615,824 | 10/1952 | Minor et al. | 260—448.2 |
| 2,628,213 | 2/1953 | Rust | 260—448.2 |
| 2,647,911 | 8/1953 | Nitzsche et al. | 260—448.2 |
| 2,823,218 | 2/1958 | Speier et al. | 160—448.2 |

(Other references on following page)

UNITED STATES PATENTS

| | | | |
|---|---|---|---|
| 2,970,150 | 1/1961 | Bailey | 260—448.2 |
| 3,132,117 | 5/1964 | Schmidt | 260—448.2 |
| 3,058,911 | 10/1962 | Matuszak et al. | 252—49.6 |
| 3,088,964 | 5/1963 | Ryan | 260—448.2 |
| 3,112,333 | 11/1963 | Bailey | 260—448.2 |
| 3,146,202 | 8/1964 | Silverstein et al. | 252—49.6 |
| 2,728,692 | 12/1955 | Dennett | 260—448.2 XR |
| 3,101,277 | 8/1963 | Eder et al. | 260—448.2 XR |
| 3,109,011 | 10/1963 | Pike et al. | |
| 3,145,175 | 8/1964 | Wright | 260—448.2 XR |
| 3,178,464 | 4/1965 | Pierpoint | 260—448.2 |

TOBIAS E. LEVOW, *Primary Examiner.*

P. F. SHAVER, *Assistant Examiner.*

U.S. Cl. X.R.

106—14, 38.22; 252—389, 400; 260—46.5, 410.9, 413, 540

PO-1050
(5/69)

UNITED STATES PATENT OFFICE
CERTIFICATE OF CORRECTION

Patent No. 3,450,736      Dated June 17, 1969

Inventor(s) Francis G. A. De Monterey

It is certified that error appears in the above-identified patent and that said Letters Patent are hereby corrected as shown below:

Column 1, lines 32-33 for "incompatiable" read --incompatible--

Column 3, line 55    for "3" read --30--

Column 3, line 75    for "by" read --to--

Column 6, Table I:V.I. for Example 8, for "199" read --119--

SIGNED AND
SEALED
APR 7 1970

(SEAL)
Attest:

Edward M. Fletcher, Jr.
Attesting Officer

WILLIAM E. SCHUYLER, JR.
Commissioner of Patents